(12) United States Patent
Sajassi et al.

(10) Patent No.: US 7,903,676 B2
(45) Date of Patent: Mar. 8, 2011

(54) TRANSPORTATION OF IEEE 802.1AH FRAMES OVER MULTIPROTOCOL LABEL SWITCHING PSEUDOWIRES FOR VIRTUAL PRIVATE LAN SERVICES

(75) Inventors: Ali Sajassi, San Ramon, CA (US); Samer M Salam, Vancouver (CA); Christopher Y. Metz, Danville, CA (US)

(73) Assignee: Cisco Technology, Inc., San Jose, CA (US)

( * ) Notice: Subject to any disclaimer, the term of this patent is extended or adjusted under 35 U.S.C. 154(b) by 88 days.

(21) Appl. No.: 12/025,998

(22) Filed: Feb. 5, 2008

(65) Prior Publication Data

US 2009/0196298 A1    Aug. 6, 2009

(51) Int. Cl.
*H04L 12/28* (2006.01)
(52) U.S. Cl. .......................................... 370/401
(58) Field of Classification Search ................ None
See application file for complete search history.

(56) References Cited

U.S. PATENT DOCUMENTS

| 2007/0098006 A1* | 5/2007 | Parry et al. ............ 370/437 |
| 2007/0116045 A1* | 5/2007 | Mohan et al. .......... 370/466 |
| 2008/0019385 A1* | 1/2008 | Sultan et al. ........... 370/401 |
| 2008/0212595 A1* | 9/2008 | Figueira et al. ........ 370/401 |
| 2008/0310417 A1* | 12/2008 | Friskney et al. ....... 370/392 |
| 2009/0041023 A1* | 2/2009 | Ould Brahim et al. ... 370/395.3 |

OTHER PUBLICATIONS

Sajassi et al., "VPLS Interoperability with Provider Backbone Bridges," Internet-Draft, L2VPB Working Group, The IETF Trust, Nov. 2007, 17 pages.
"Virtual Bridged Local Area Networks—Amendment 6: Provider Backbone Bridges," IEEE P802.1ah/D3.3, Draft Standard for Local and Metropolitan Area Networks, IEEE Computer Society, Dec. 13, 2006, 195 pages.
Martini et al., "Encapsulation Methods for Transport of Ethernet over MPLS Networks," RFC 4448, Category: Standards Track, The Internet Society, Apr. 2006, 24 pages.
Andersson et al., "Framework for Layer 2 Virtual Private Networks (L2VPNs)," RFC 4664, Category: Informational, The Internet Society, Sep. 2006, 44 pages.

* cited by examiner

*Primary Examiner* — Pankaj Kumar
*Assistant Examiner* — Marcus R Smith
(74) *Attorney, Agent, or Firm* — The Law Office of Kirk D. Williams (57) ABSTRACT

Disclosed are, inter alia, methods, apparatus, computer-storage media, mechanisms, and means for transportation of IEEE 802.1ah frames over Multiprotocol Label Switching (MPLS) pseudowires for Virtual Private LAN Services (VPLS). The IEEE 802.1ah frames include a corresponding B-VLAN tag, while the MPLS packets including these frames do not include the corresponding B-VLAN tag, and disclosed are methods and apparatus for performing such translation.

20 Claims, 8 Drawing Sheets

TRANSPORTATION OF IEEE 802.1AH FRAMES OVER MULTIPROTOCOL LABEL SWITCHING PSEUDOWIRES FOR VIRTUAL PRIVATE LAN SERVICES

TECHNICAL FIELD

The present disclosure relates generally to communications and computer systems, especially routers, packet switching systems, and other network devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Note, nothing described or referenced in this document is admitted as prior art to this application unless explicitly so stated.

It is expected for customer Ethernet-based networks at different locations to be interconnected via a Virtual Private LAN Service (VPLS) using Provider Backbone Bridges (PBBs). The Ethernet Provider Backbone Bridge (PBB) standard provides for layering the Ethernet network into customer and provider domains with complete isolation among their MAC addresses. This standard defines a B-DA and B-SA to indicate the backbone destination and source addresses, and also define B-VID (backbone VLAN ID) and I-SID (Service Instance VLAN ID).

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Disclosed are, inter alia, methods, apparatus, computer-storage media, mechanisms, and means for transportation of IEEE 802.1ah frames over Multiprotocol Label Switching (MPLS) pseudowires for Virtual Private LAN Services (VPLS). One embodiment includes: (a) one or more interfaces configured to receive a first plurality of IEEE 802.1ah frames and to send a second plurality of IEEE 802.1ah frames, wherein each of the first plurality of IEEE 802.1ah frames include a corresponding B-VLAN tag; (b) one or more interfaces configured to receive a first plurality of Multiprotocol Label Switching (MPLS) packets over one or more MPLS pseudowires and to send a second plurality of MPLS packets over said one or more MPLS pseudowires; and (c) one or more translation processing elements configured to translate the first plurality of IEEE 802.1ah frames for transport over said one or more MPLS pseudowires in the second plurality of MPLS packets which do not include said corresponding B-VLAN tags, and for translating the first plurality of MPLS packet into the second plurality of IEEE 802.1ah frames. In one embodiment, said translation processing elements are configured to update the Service Instance VLAN ID (I-SID) value in said translation from the first plurality of MPLS packet into the second plurality of IEEE 802.1ah frames. In one embodiment, each of the plurality of MPLS pseudowires is neither Type 4 nor Type 5. In one embodiment, the apparatus is a Virtual Private LAN Service Provider Edge device (VPLS PE).

2. Description

Disclosed are, inter alia, methods, apparatus, computer-storage media, mechanisms, and means for transportation of IEEE 802.1ah frames over Multiprotocol Label Switching (MPLS) pseudowires for Virtual Private LAN Services (VPLS).

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation).

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-storage media, mechanisms, and means for transportation of IEEE 802.1ah frames over Multiprotocol Label Switching (MPLS) pseudowires for Virtual Private LAN Services (VPLS).

One embodiment includes one or more interfaces configured to receive a first plurality of IEEE 802.1ah frames and to send a second plurality of IEEE 802.1ah frames, wherein each of the first plurality of IEEE 802.1ah frames include a corresponding B-VLAN tag; one or more interfaces configured to receive a first plurality of Multiprotocol Label Switching (MPLS) packets over one or more MPLS pseudowires and to send a second plurality of MPLS packets over said one or more MPLS pseudowires; and one or more translation processing elements configured to translate the first plurality of IEEE 802.1ah frames for transport over said one or more MPLS pseudowires in the second plurality of MPLS packets which do not include said corresponding B-VLAN tags, and for translating the first plurality of MPLS packet into the second plurality of IEEE 802.1ah frames.

In one embodiment, said translation processing elements are configured to update the Service Instance VLAN ID (I-SID) value in said translation from the first plurality of MPLS packet into the second plurality of IEEE 802.1ah frames. In one embodiment, each of the plurality of MPLS pseudowires is neither Type 4 nor Type 5. In one embodiment, the apparatus is a Virtual Private LAN Service Provider Edge device (VPLS PE).

One embodiment includes one or more bridge modules; and one or more virtual forwarding instances configured for each packet of a plurality of Multiprotocol Label Switching (MPLS) packets received on a pseudowire to: remove the MPLS encapsulation to expose a frame; write a new Service Instance VLAN ID (I-SID) into the frame; and to forward the frame to the bridge module. Each bridge module is configured for each particular frame of the plurality of frames received from said one or more virtual forwarding instances: to add a B-VLAN Tag to the particular frame based on its said I-SID; and to determine an egress port for the frame based on the B-Destination Address in the Frame in a Bridging Domain corresponding to the B-VLAN Tag, and wherein the apparatus is configured to send the particular frame out the egress port.

In one embodiment, the apparatus is configured to receive a plurality of 802.1ah frames; and for each particular 802.1ah frame of the plurality of 802.1ah frames, to convert said particular 802.1ah frame to an MPLS packet and to forward the MPLS packet over one or more of a plurality of pseudowires; wherein the plurality of pseudowires includes the pseudowire. In one embodiment, the pseudowire is neither Type 4 nor Type 5. In one embodiment, the apparatus is a Virtual Private LAN Service Provider Edge device (VPLS PE).

One embodiment includes: a bridge module; and one or more virtual forwarding instances configured for each packet of a plurality of Multiprotocol Label Switching (MPLS) packets received on a pseudowire to: remove the MPLS encapsulation to expose a frame; write a new Service Instance VLAN ID (I-SID) into the frame; and to forward the frame to the bridge module. The bridge module is configured for each particular frame of the plurality of frames received from said one or more virtual forwarding instances: to select a bridge domain based on the corresponding ingress customer backbone port; and to determine an egress port for the frame based on the B-Destination Address, and wherein the apparatus is configured to send the particular frame out the egress port.

In one embodiment, the apparatus is configured to receive a plurality of 802.1ah frames; and for each particular 802.1ah frame of the plurality of 802.1ah frames, to convert said particular 802.1ah frame to an MPLS packet and to forward the MPLS packet over one or more of a plurality of pseudowires; wherein the plurality of pseudowires includes the pseudowire. In one embodiment, the pseudowire is neither Type 4 nor Type 5. In one embodiment, the apparatus is a Virtual Private LAN Service Provider Edge device (VPLS PE).

One embodiment includes a method performed by a Virtual Private LAN Service Provider Edge device (VPLS PE), with this method comprising: receiving a Multiprotocol Label Switching (MPLS) packet over a MPLS pseudowire; translating said received MPLS packet into an 802.1ah frame, including updating the Service Instance VLAN ID (I-SID) value; determining a port based on said updated I-SID value, a B-VLAN ID and a B-Destination address of the frame; and forwarding the frame from the determined port.

In one embodiment, the pseudowire is neither Type 4 nor Type 5. One embodiment includes: receiving a particular 802.1ah frame; translating the particular 802.1ah frame into a particular MPLS packet; and forwarding the particular MPLS packet over the MPLS pseudowire.

One embodiment includes: means for receiving a Multiprotocol Label Switching (MPLS) packet over a MPLS pseudowire; means for translating said received MPLS packet into an 802.1ah frame, including updating the Service Instance VLAN ID (I-SID) value; means for determining a port based on said updated I-SID value, a B-VLAN ID and a B-Destination address of the frame; and means for forwarding the frame from the determined port.

In one embodiment, the pseudowire is neither Type 4 nor Type 5. One embodiment includes: means for receiving a particular 802.1ah frame; means for translating the particular 802.1ah frame into a particular MPLS packet; and means for forwarding the particular MPLS packet over the MPLS pseudowire.

Figure 1:
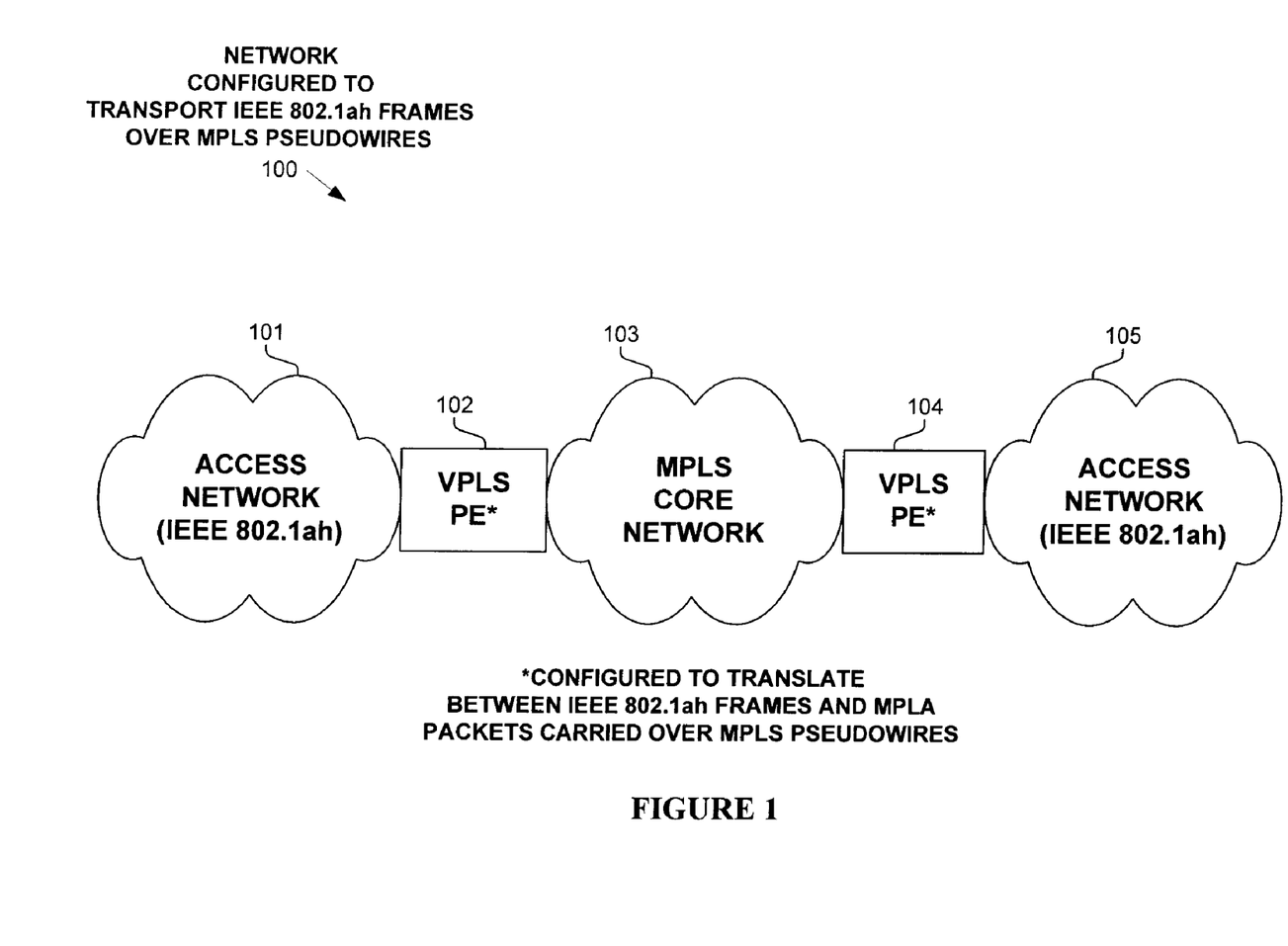
FIG. 1 illustrates an example network operating according to one embodiment.

Turning expressly to the figures, FIG. 1 illustrates an example network 100 configured to transport IEEE 802.1ah frames over MPLS pseudowires, with Virtual Private LAN Service Provider Edge device (VPLS PE) 102 and 104 configured to translate between IEEE 802.1ah frames (carried over access networks 101 and 105) and MPLS packets carried over MPLS pseudowires (in MPLS core network 103).

Figure 2:
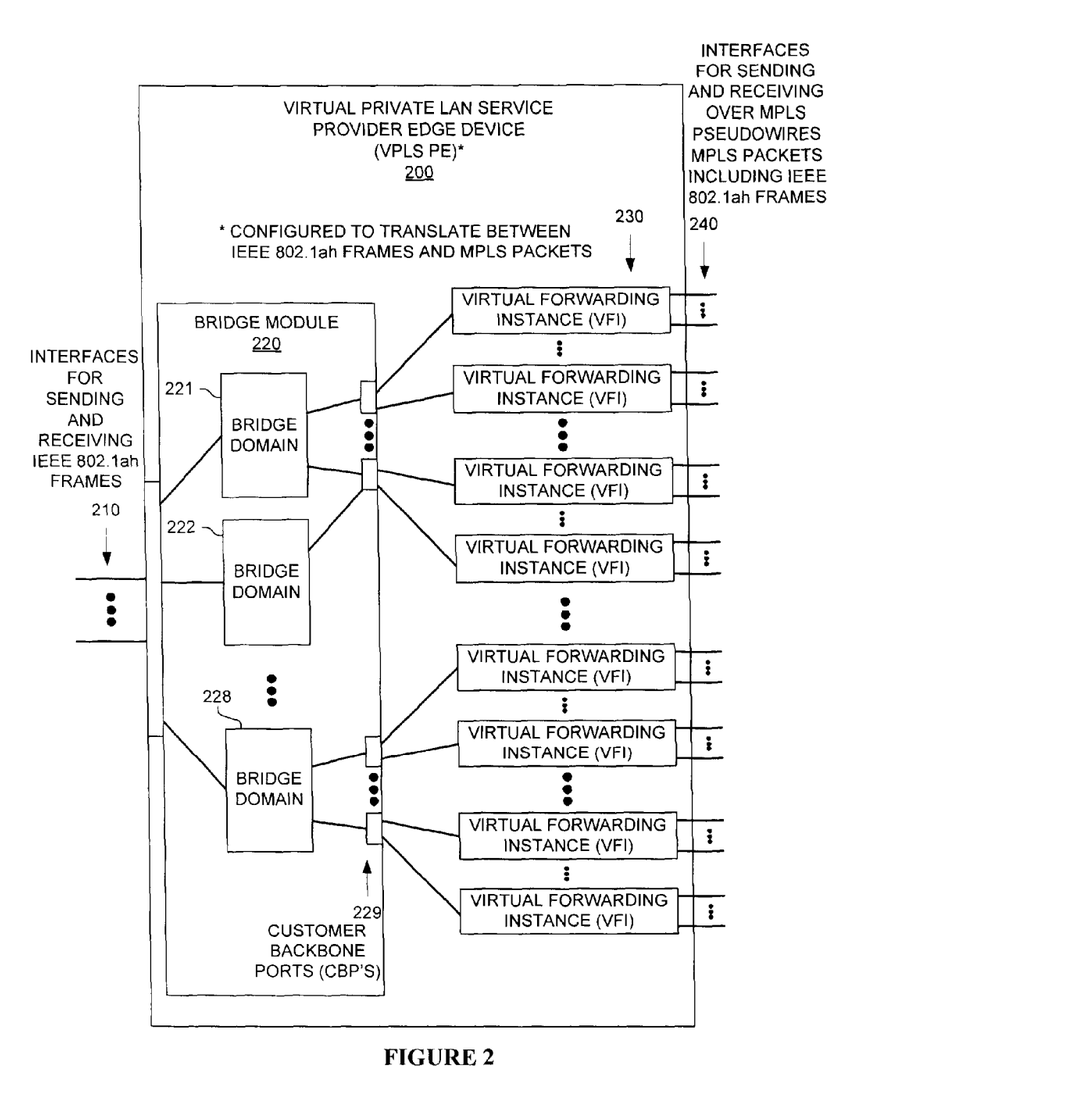
FIG. 2 illustrates a packet switching device operating according to one embodiment.

FIG. 2 illustrates a functional view of a packet switching device 200, such as, but not limited to, a Virtual Private LAN Service Provider Edge device (VPLS PE) configured to translate between 802.1ah frames and MPLS packets according to one embodiment.

Figure 4:
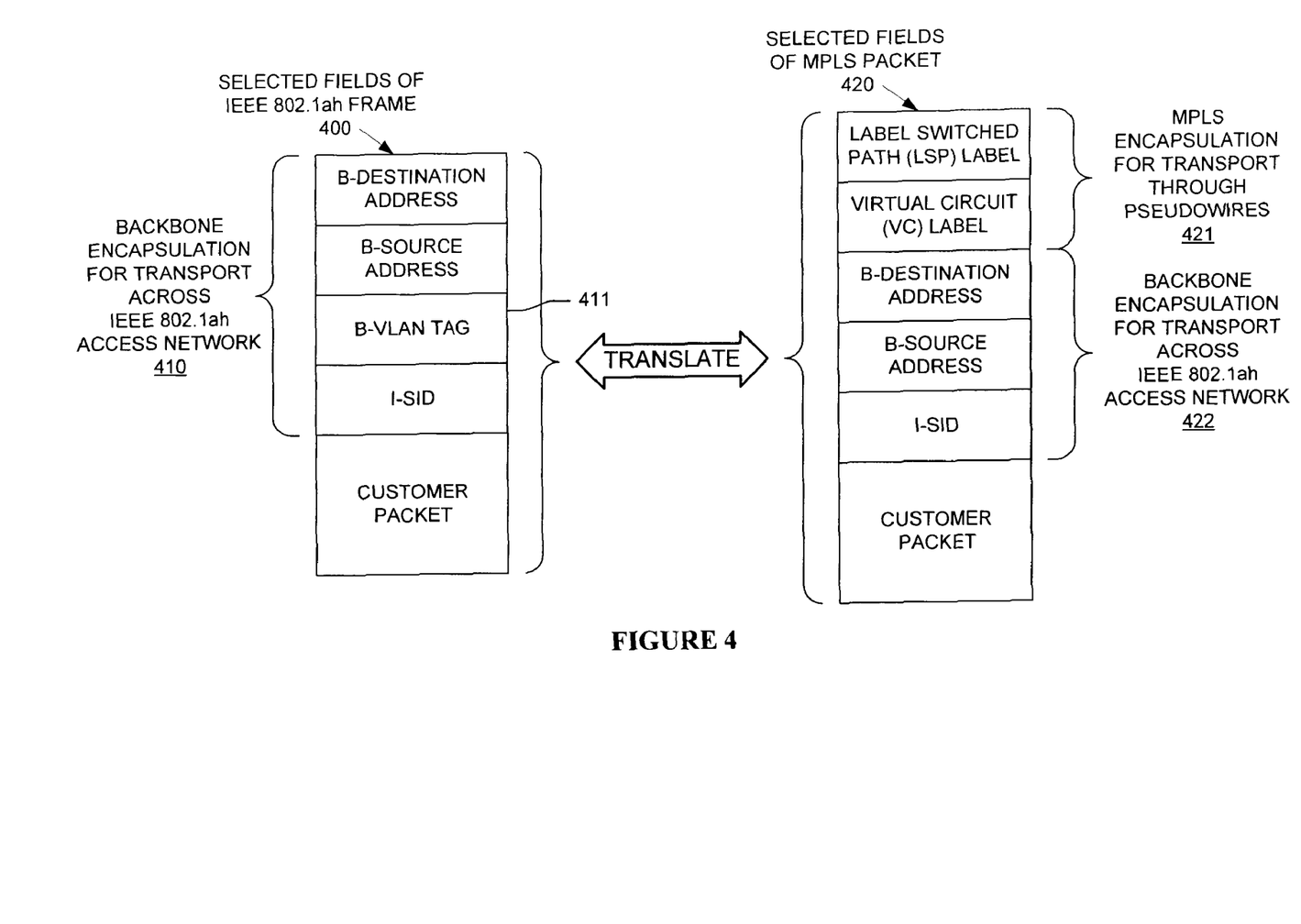
FIG. 4 illustrates translation between IEEE 802.1ah frames and Multiprotocol Label Switching (MPLS) packets according to one embodiment.

As shown in FIG. 2, VPLS PE 200 includes interfaces 210 configured for sending and receiving IEEE 802.1ah frames, and interfaces 240 configured for sending and receiving MPLS packets (including MPLS encapsulated 802.1ah frames) carried over MPLS pseudowires. In one embodiment, these pseudowires are neither type 4 nor 5, as the definition of these pseudowire types according to the current standards require a different translation than performed in one embodiment. As shown, bridge module 220 includes multiple bridge domains 221-228, which interface virtual customer backbone ports 229, which logically connect to virtual forwarding instances 230, which provide access to and from interfaces 240 configured for sending and receiving MPLS packets (including MPLS encapsulated IEEE 802.1ah frames) carried over MPLS pseudowires. Note, as explicitly described hereinafter, FIG. 4 illustrates the resulting translations performed by one embodiment, and the flow diagrams describe such translation as performed in some of an extensible number of embodiments.

Figure 3:
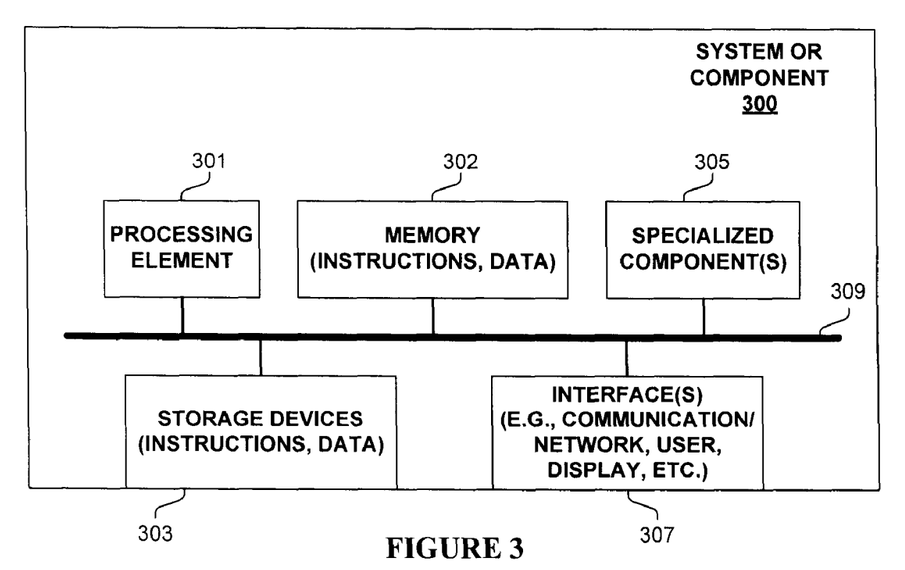
FIG. 3 illustrates an example system or component used in one embodiment.

FIG. 3 is block diagram of a system or component 300 used in one embodiment for performing the translation for transportation of IEEE 802.1ah frames over MPLS pseudowires. In one embodiment, system or component 300 performs one or more processes corresponding to one of the flow diagrams illustrated or otherwise described herein.

In one embodiment, system or component 300 includes a processing element 301, memory 302, storage devices 303, specialized components 305 (e.g. optimized hardware such as for performing classification operations, etc.), and interface (s) 307 for communicating information (e.g., sending and receiving packets, user-interfaces, displaying information, etc.), which are typically communicatively coupled via one or more communications mechanisms 309, with the communications paths typically tailored to meet the needs of the application.

Various embodiments of component 300 may include more or less elements. The operation of component 300 is typically controlled by processing element 301 using memory 302 and storage devices 303 to perform one or more tasks or processes. Memory 302 is one type of computer-readable/computer-storage medium, and typically comprises random access memory (RAM), read only memory (ROM), flash memory, integrated circuits, and/or other memory components. Memory 302 typically stores computer-executable instructions to be executed by processing element 301 and/or data which is manipulated by processing element 301 for implementing functionality in accordance with an embodiment. Storage devices 303 are another type of computer-readable medium, and typically comprise solid state storage media, disk drives, diskettes, networked services, tape drives, and other storage devices. Storage devices 303 typically store computer-executable instructions to be executed by processing element 301 and/or data which is manipulated by processing element 301 for implementing functionality in accordance with an embodiment.

FIG. 4 illustrates translation between IEEE 802.1ah frames and Multiprotocol Label Switching (MPLS) packets according to one embodiment. Illustrated are selected fields 400 of an IEEE 802.1ah frame and selected fields 420 of a MPLS packet including an encapsulated IEEE 802.1ah frame. As shown, selected fields 400 of an IEEE 802.1ah frame include a backbone encapsulation 410 for transport across an access network, and selected fields 420 of the MPLS packet include MPLS encapsulation fields 421 and backbone encapsulation fields 422. Note, backbone encapsulation fields 422 do not include a B-VLAN TAG (411). Therefore, the translation from a MPLS packet (420) must generate B-VLAN TAG 411 for an IEEE 802.1ah frame (400). Similarly, the translation of IEEE 802.1ah frame (400) must generate the appropriate MPLS packet fields 420.

Figure 5A:
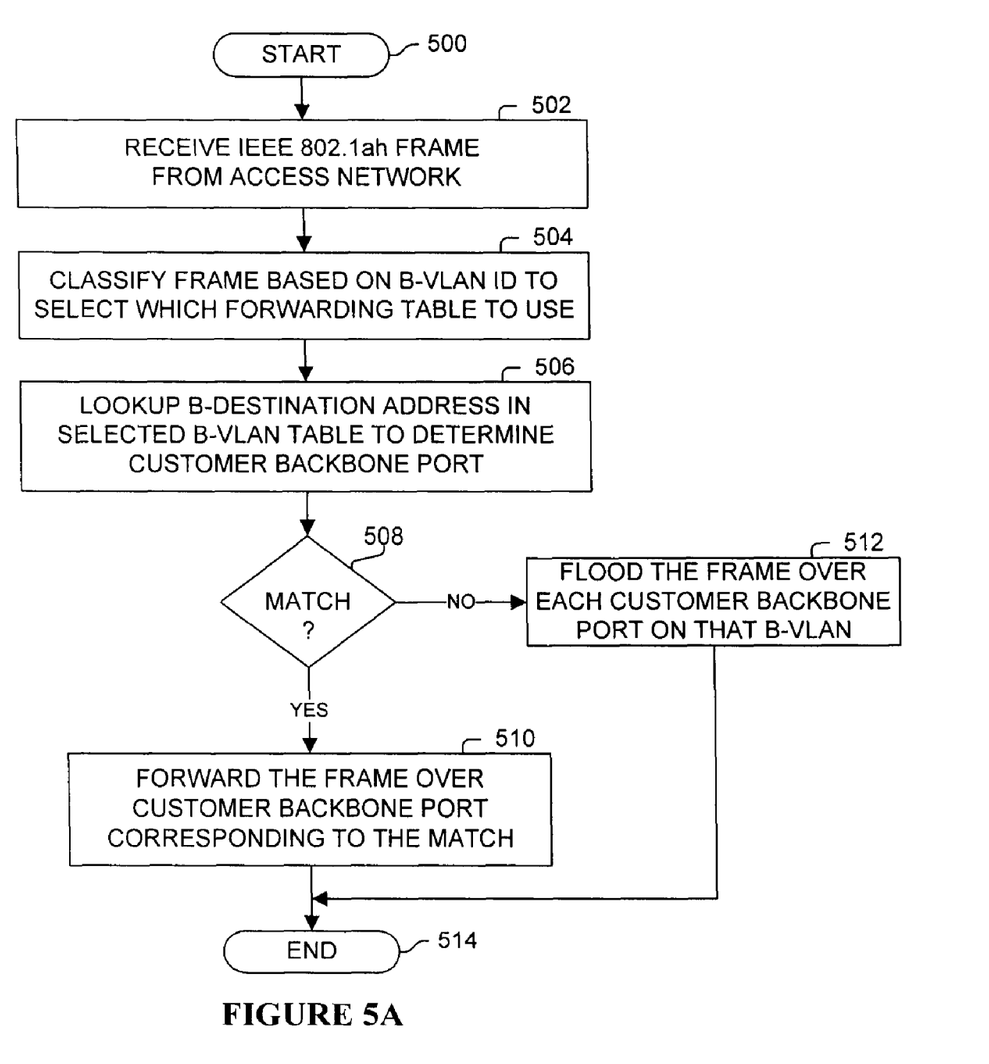
FIG. 5A illustrates a process performed in one embodiment.
Figure 5B:
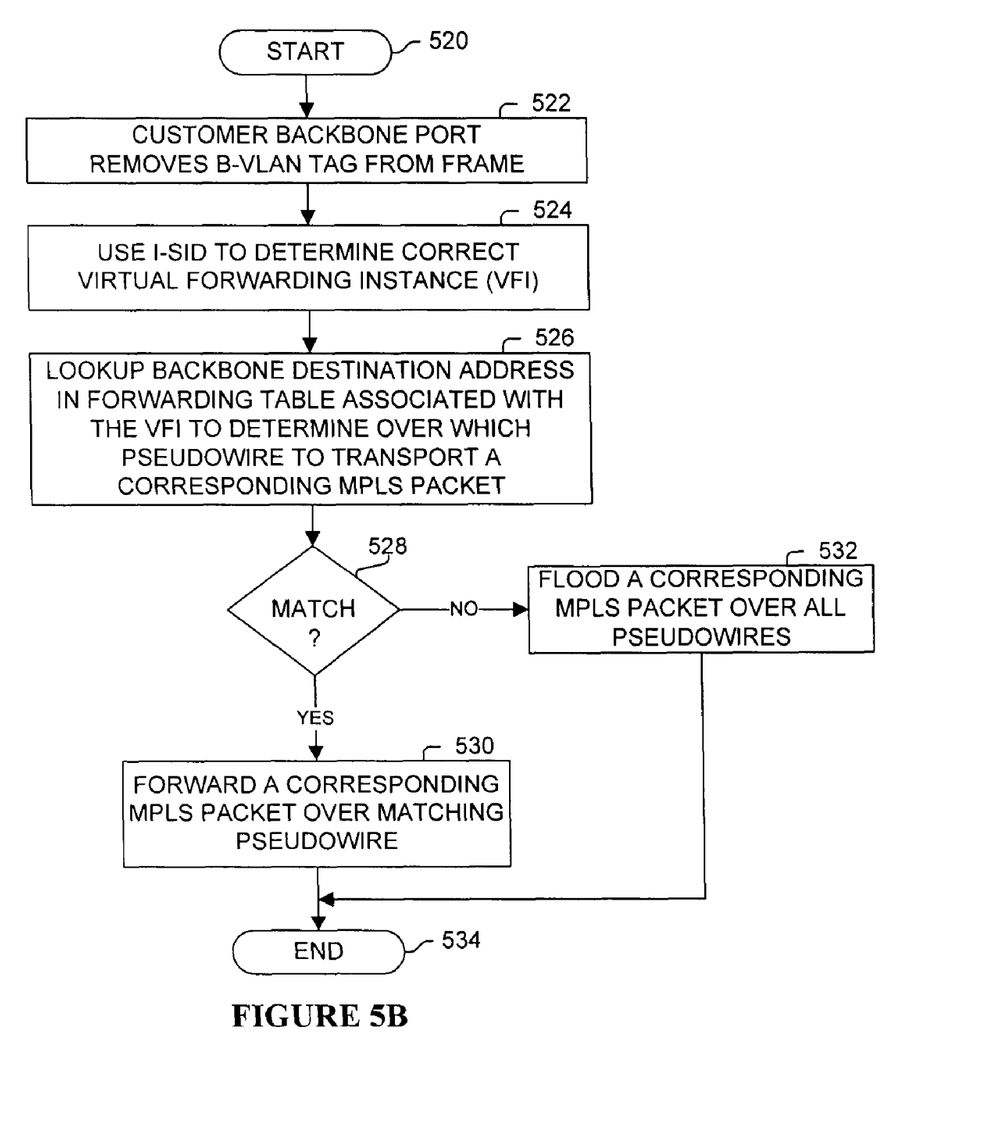
FIG. 5B illustrates a process performed in one embodiment.

FIGS. 5A-B illustrates a process used in one embodiment in performing translation between IEEE 802.1ah frames and MPLS packets for transportation across MPLS pseudowires. First, in regards to FIG. 5A, processing begins with process block 500. In process block 502, an IEEE 802.1ah frame is received from an access network. In process block 504, the B-VLAN ID of the received frame is used to determine which forwarding table (e.g., bridge domain) to use. In process block 506, a lookup operation is performed on the B-Destination address in the selected B-VLAN table to determine the Customer Backbone Port (CBP). As determined in process block 508, if the lookup operation resulted in a match, then, in process block 510, the frame is forwarded over the CBP corresponding to the match. Otherwise, in process block 512, the frame is flooded over each CBP on that B-VLAN. Processing of the flow diagram of FIG. 5A is complete as indicated by process block 514.

Turning to FIG. 5B, processing begins with process block 520. In process block 522, the CBP removes the B-VLAN Tag from the frame. In process block 524, the Service Instance VLAN ID (I-SID) value is use to determine the correct virtual forwarding instance (VFI). In process block 526, a lookup operation is performed on the backbone destination address (B-DA) in a forwarding table associated with the VFI to determine over which pseudowire to transport a corresponding MPLS packet. As determined in process block 528, if there is a match, then in process block 530, the MPLS packet is forwarded over the pseudowire corresponding to the match; otherwise, in process block 532, the MPLS packet is flooded over all the MPLS pseudowires. Processing of the flow diagram of FIG. 5B is complete as indicated by process block 534.

Figure 6:
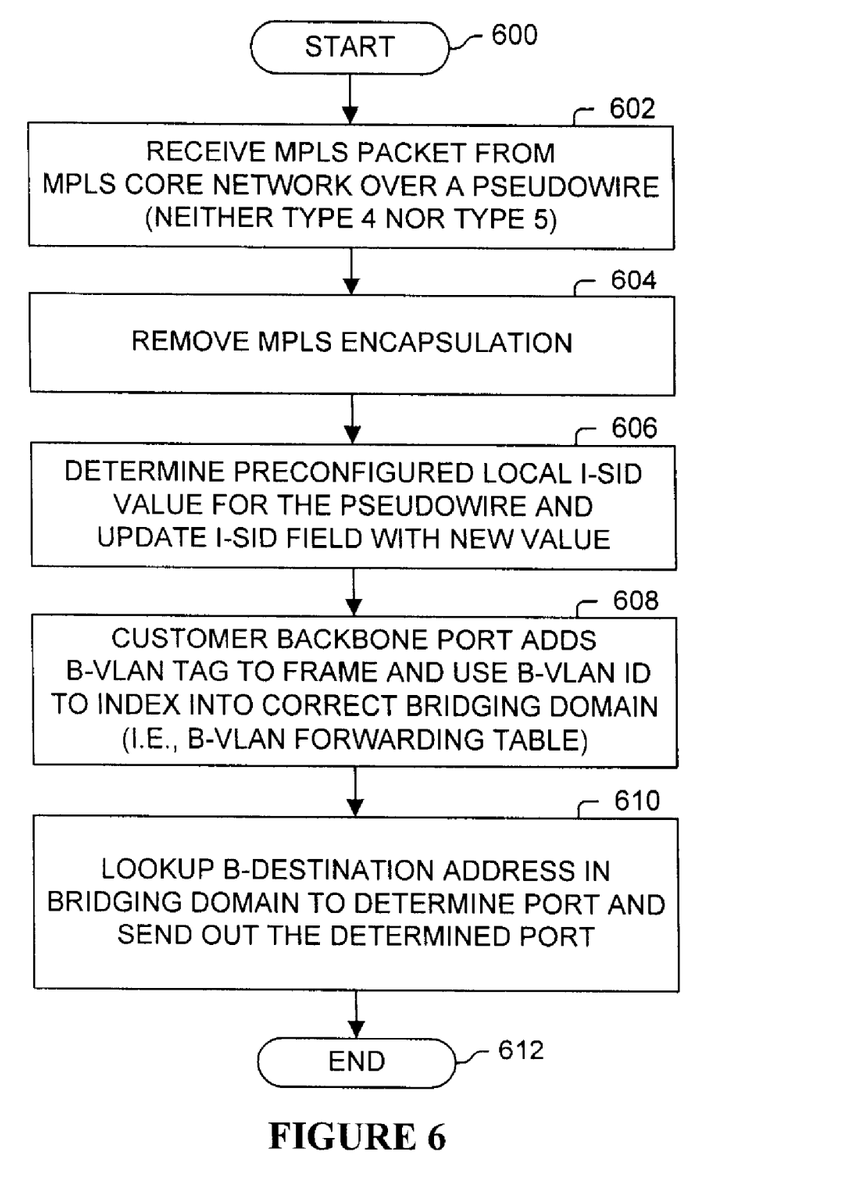
FIG. 6 illustrates a process performed in one embodiment.

FIG. 6 illustrates a process used in one embodiment in performing translation between MPLS packets received on MPLS pseudowires into IEEE 802.1ah frames. Processing begins with process block 600. In process block 602, a MPLS packet is received from the MPLS core network over a pseudowire (e.g., neither Type 4 nor Type 5). In process block 604, the MPLS encapsulation is removed. In process block 606, the preconfigured local I-SID value is determined for the pseudowire, and the I-SID value is updated in the IEEE 802.1ah frame. In process block 608, the CBP adds a B-VLAN Tag to the IEEE 802.1ah frame, and the B-VLAN ID is used to index into the correct bridging domain (e.g., the correct B-VLAN forwarding table). In process block 610, a lookup operation on the B-Destination Address is performed in the determined bridging domain to determine the egress port; and the IEEE 802.1ah frame is sent out the determined egress port. Processing of the flow diagram of FIG. 6 is complete as indicated by process block 612.

Figure 7:
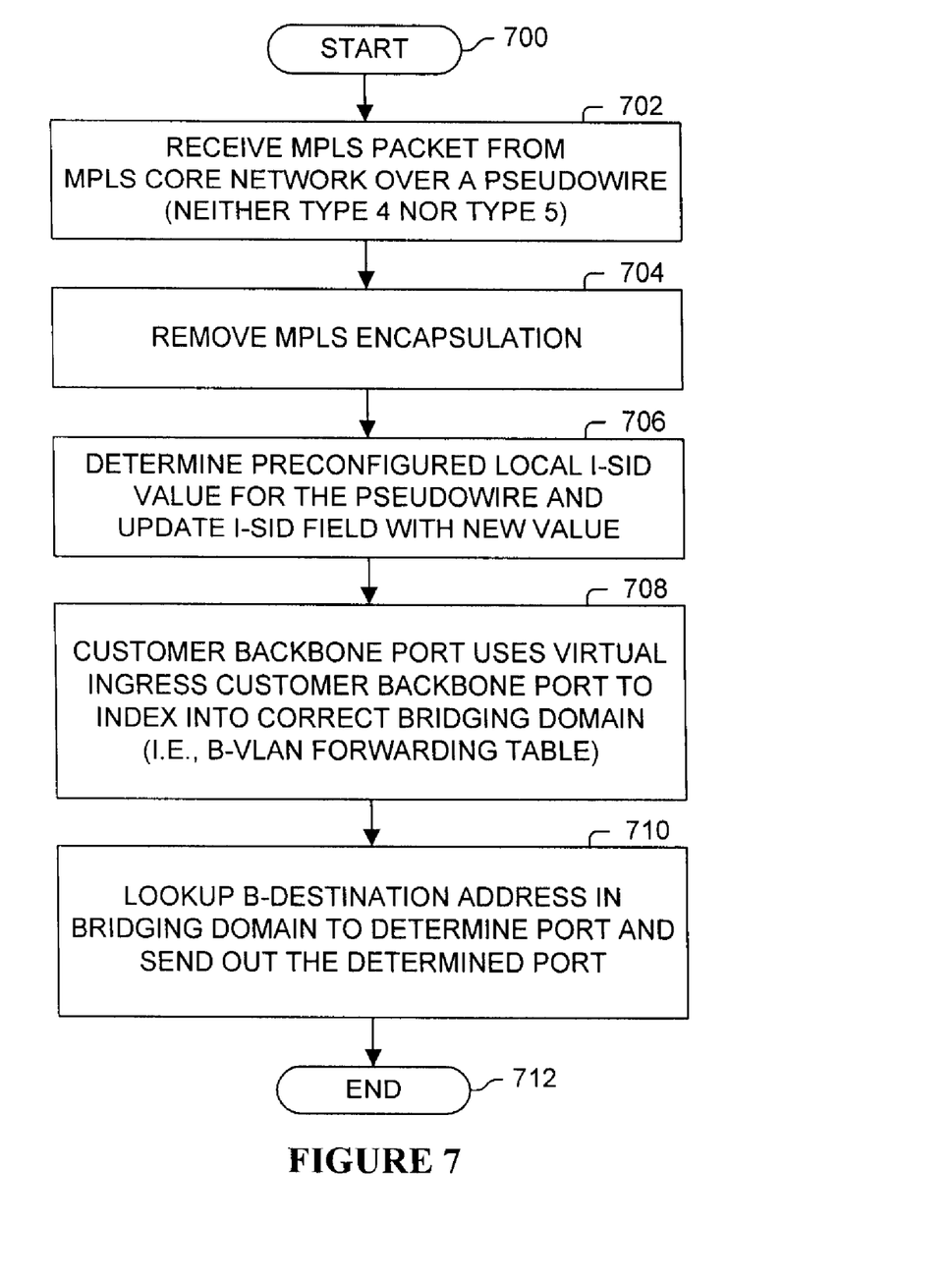
FIG. 7 illustrates a process performed in one embodiment.

FIG. 7 illustrates a process used in one embodiment in performing translation between MPLS packets received on MPLS pseudowires into IEEE 802.1ah frames. This process is a variant of that illustrated in FIG. 6, but uses the CBP to determine which bridging domain to use (rather than based on the B-VLAN ID). Turning to FIG. 7, processing begins with process block 700. In process block 702, a MPLS packet is received from the MPLS core network over a pseudowire (e.g., neither Type 4 nor Type 5). In process block 704, the MPLS encapsulation is removed. In process block 706, the preconfigured local I-SID value is determined for the pseudowire, and the I-SID value is updated in the IEEE 802.1ah frame. In process block 708, the virtual CBP on which the frame was received is used to index into the correct bridging domain (e.g., the correct B-VLAN forwarding table). In process block 710, a lookup operation on the B-Destination Address is performed in the determined bridging domain to determine the egress port; and the IEEE 802.1ah frame is sent out the determined egress port. Processing of the flow diagram of FIG. 7 is complete as indicated by process block 712.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus, comprising:
   one or more interfaces configured to receive a first plurality of IEEE 802.1ah frames and to send a second plurality of IEEE 802.1ah frames, wherein each of the first plurality of IEEE 802.1ah frames include a corresponding B-VLAN tag;
   one or more interfaces configured to receive a first plurality of Multiprotocol Label Switching (MPLS) packets over one or more MPLS pseudowires and to send a second plurality of MPLS packets over said one or more MPLS pseudowires; and
   one or more translation processing elements configured to translate the first plurality of IEEE 802.1ah frames for transport over said one or more MPLS pseudowires in the second plurality of MPLS packets which do not include said corresponding B-VLAN tags, and for translating the first plurality of MPLS packets into the second plurality of IEEE 802.1ah frames;
   wherein said translation processing elements are configured to update the Service Instance VLAN ID (I-SID) value in said translation from the first plurality of MPLS packet into the second plurality of IEEE 802.1ah frames.

2. The apparatus of claim 1, wherein the apparatus is a Virtual Private LAN Service Provider Edge device (VPLS PE).

3. An apparatus, comprising:
   one or more interfaces configured to receive a first plurality of IEEE 802.1ah frames and to send a second plurality of IEEE 802.1ah frames, wherein each of the first plurality of IEEE 802.1ah frames include a corresponding B-VLAN tag;
   one or more interfaces configured to receive a first plurality of Multiprotocol Label Switching (MPLS) packets over one or more MPLS pseudowires and to send a second plurality of MPLS packets over said one or more MPLS pseudowires; and
   one or more translation processing elements configured to translate the first plurality of IEEE 802.1ah frames for transport over said one or more MPLS pseudowires in the second plurality of MPLS packets which do not include said corresponding B-VLAN tags, and for translating the first plurality of MPLS packets into the second plurality of IEEE 802.1ah frames;
   wherein each of the plurality of MPLS pseudowires is neither Type 4 nor Type 5.

4. The apparatus of claim 3, wherein the apparatus is a Virtual Private LAN Service Provider Edge device (VPLS PE).

5. An apparatus, comprising:
   a bridge module; and
   one or more virtual forwarding instances configured, for each packet of a plurality of Multiprotocol Label Switching (MPLS) packets received on a pseudowire, to: remove the MPLS encapsulation to expose a frame; update the Service Instance VLAN ID (I-SID) included in the MPLS encapsulation to a different preconfigured I-SID; write said I-SID into the frame; and to forward the frame to the bridge module; and
   wherein the bridge module is configured, for each particular frame of the plurality of frames received from said one or more virtual forwarding instances, to: select a bridge domain based on its said I-SID; and determine an egress port for the frame based on the B-Destination Address; and
   wherein the apparatus is configured to send said each particular frame out the egress port.

6. The apparatus of claim 5, wherein the apparatus is configured to receive a plurality of 802.1ah frames; and for each particular 802.1ah frame of the plurality of 802.1ah frames, to convert said particular 802.1ah frame to an MPLS packet and to forward the MPLS packet over one or more of a plurality of pseudowires; wherein the plurality of pseudowires includes the pseudowire.

7. The apparatus of claim 5, wherein the pseudowire is neither Type 4 nor Type 5.

8. The apparatus of claim 5, wherein the apparatus is a Virtual Private LAN Service Provider Edge device (VPLS PE).

9. An apparatus, comprising:
   a bridge module; and
   one or more virtual forwarding instances configured, for each packet of a plurality of Multiprotocol Label Switching (MPLS) packets received on a pseudowire, to: remove the MPLS encapsulation to expose a frame; update the Service Instance VLAN ID (I-SID) included in the MPLS encapsulation to a different preconfigured I-SID; write said I-SID into the frame; and forward the frame to the bridge module; and
   wherein the bridge module is configured, for each particular frame of the plurality of frames received from said one or more virtual forwarding instances, to determine an egress port for the frame based on the B-Destination Address in the Frame in a Bridging Domain corresponding to an ingress customer backbone port; and
   wherein the apparatus is configured to send said each particular frame out the egress port.

10. The apparatus of claim 9, wherein the apparatus is configured to receive a plurality of 802.1ah frames; and for each particular 802.1ah frame of the plurality of 802.1ah frames, to convert said particular 802.1ah frame to an MPLS packet and to forward the MPLS packet over one or more of a plurality of pseudowires; wherein the plurality of pseudowires includes the pseudowire.

11. The apparatus of claim 9, wherein the pseudowire is neither Type 4 nor Type 5.

12. The apparatus of claim 9, wherein the apparatus is a Virtual Private LAN Service Provider Edge device (VPLS PE).

13. A method performed by a Virtual Private LAN Service Provider Edge device (VPLS PE), the method comprising:
- receiving a Multiprotocol Label Switching (MPLS) packet over a MPLS pseudowire;
- translating said received MPLS packet into an 802.1ah frame, including updating the Service Instance VLAN ID (I-SID) value from the I-SID included in the MPLS encapsulation of said MPLS packet to a different preconfigured I-SID;
- determining a port based on said updated I-SID value, a B-VLAN ID and a B-Destination address of the frame; and
- forwarding the frame from the determined port.

14. The method of claim 13, wherein the pseudowire is neither Type 4 nor Type 5.

15. The method of claim 13, comprising: receiving a particular 802.1ah frame; translating the particular 802.1ah frame into a particular MPLS packet; and
- forwarding the particular MPLS packet over the MPLS pseudowire.

16. An apparatus comprising:
- means for receiving a Multiprotocol Label Switching (MPLS) packet over a MPLS pseudowire;
- means for translating said received MPLS packet into an 802.1ah frame, including updating the Service Instance VLAN ID (I-SID) value from the I-SID included in the MPLS encapsulation of said MPLS packet to a different preconfigured I-SID;
- means for determining a port based on said updated I-SID value, a B-VLAN ID and a B-Destination address of the frame; and
- means for forwarding the frame from the determined port.

17. The apparatus of claim 16, wherein the pseudowire is neither Type 4 nor Type 5.

18. The apparatus of claim 16, comprising: means for receiving a particular 802.1ah frame; means for translating the particular 802.1ah frame into a particular MPLS packet; and means for forwarding the particular MPLS packet over the MPLS pseudowire.

19. The apparatus of claim 18, wherein the apparatus is a Virtual Private LAN Service Provider Edge device (VPLS PE).

20. The apparatus of claim 16, wherein the apparatus is a Virtual Private LAN Service Provider Edge device (VPLS PE).

* * * * *